United States Patent
Inoue

(10) Patent No.: US 10,631,540 B2
(45) Date of Patent: Apr. 28, 2020

(54) PLANT DISEASE CONTROL COMPOSITION, AND PLANT DISEASE CONTROL METHOD

(71) Applicant: Sumitomo Chemical Company, Limited, Tokyo (JP)

(72) Inventor: Takuya Inoue, Tokyo (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 15/778,838

(22) PCT Filed: Nov. 24, 2016

(86) PCT No.: PCT/JP2016/084739
§ 371 (c)(1),
(2) Date: May 24, 2018

(87) PCT Pub. No.: WO2017/094576
PCT Pub. Date: Jun. 8, 2017

(65) Prior Publication Data
US 2018/0352810 A1 Dec. 13, 2018

(30) Foreign Application Priority Data
Dec. 1, 2015 (JP) ................. 2015-234484

(51) Int. Cl.
*A01N 43/78* (2006.01)
*A01N 37/46* (2006.01)
*A01N 43/80* (2006.01)

(52) U.S. Cl.
CPC ............. *A01N 43/78* (2013.01); *A01N 37/46* (2013.01); *A01N 43/80* (2013.01)

(58) Field of Classification Search
CPC combination set(s) only.
See application file for complete search history.

(56) References Cited

U.S. PATENT DOCUMENTS

| 5,514,643 A | 5/1996 | Rew et al. |
| 2008/0200334 A1 | 8/2008 | Tormo I Blasco et al. |

(Continued)

FOREIGN PATENT DOCUMENTS

| CL | 2014002250 A1 | 1/2015 |
| CN | 101969781 A | 2/2011 |

(Continued)

OTHER PUBLICATIONS

Int'l Search Report dated Feb. 21, 2017 in Int'l Application No. PCT/JP2016/084739 (Translation Only).

(Continued)

*Primary Examiner* — John Pak
(74) *Attorney, Agent, or Firm* — Panitch Schwarze Belisario & Nadel LLP

(57) ABSTRACT

The present invention provides a composition for controlling plant diseases containing a compound represented by the following Formula (1):

a compound represented by the following Formula (2):

and a compound represented by the following Formula (3):

In Formula (3), a combination of $R^1$, $R^2$, $R^3$, and $R^4$ is a combination in which $R^1$ represents a methyl group, $R^2$ represents a trifluoromethyl group, and both $R^3$ and $R^4$ represent a fluorine atom, or a combination in which both $R^1$ and $R^2$ represent a difluoromethyl group, $R^3$ represents a chlorine atom, and $R^4$ represents a methanesulfonyloxy group. The present invention also provides a method for controlling plant diseases, comprising applying an effective amount of the compound of Formula (1), the compound of Formula (2), and the compound of Formula (3) to a plant or (Continued)

soil for cultivating a plant, each having an excellent controlling activity on plant diseases.

8 Claims, No Drawings

(56) References Cited

U.S. PATENT DOCUMENTS

| | | | |
|---|---|---|---|
| 2008/0234295 A1 | 9/2008 | Beck et al. | |
| 2010/0240619 A1* | 9/2010 | Gregory | A01N 43/40 514/154 |

FOREIGN PATENT DOCUMENTS

| | | |
|---|---|---|
| CN | 104244716 A | 12/2014 |
| CN | 104336023 A | 2/2015 |
| CN | 104336038 A | 2/2015 |
| JP | 2010159277 A | 7/2010 |
| JP | 2011500826 A | 1/2011 |
| JP | 2015511579 A | 4/2015 |
| WO | 2001084930 A1 | 11/2001 |
| WO | 2009007233 A2 | 1/2009 |
| WO | 2009055514 A2 | 4/2009 |
| WO | 2011108123 A2 | 9/2011 |
| WO | 2011108125 A2 | 9/2011 |
| WO | 2012039068 A1 | 3/2012 |
| WO | 2012117572 A1 | 9/2012 |
| WO | 2013127704 A1 | 9/2013 |

OTHER PUBLICATIONS

Int'l Preliminary Report on Patentability dated Jun. 5, 2018 in Int'l Application No. PCT/JP2016/084739 (Translation Only).
Office Action dated May 17, 2019 in CL Application No. 201801455.
Office Action dated Nov. 18, 2019 in CL Application No. 201801455 (with English translation).
Office Action dated Aug. 14, 2019 in CO Application No. NC2018/0005698.
Office Action dated Jan. 16, 2020 in CN Application No. 201680070214.3.
Office Action dated Feb. 11, 2020 in IN Application No. 201847023535.

* cited by examiner

PLANT DISEASE CONTROL COMPOSITION, AND PLANT DISEASE CONTROL METHOD

CROSS-REFERENCE TO RELATED APPLICATION

This application is a Section 371 of International Application No. PCT/JP2016/084739, filed Nov. 24, 2016, which was published in the Japanese language on Jun. 8, 2017, under International Publication No. WO 2017/094576 A1, which claims priority under 35 U.S.C. § 119(b) to Japanese Application No. 2015-234484, filed Dec. 1, 2015, the disclosures of which are incorporated herein by reference in their entirety.

TECHNICAL FIELD

The present invention relates to a composition for controlling plant diseases and a method for controlling plant diseases.

BACKGROUND ART

In the related art, various compounds have been known as active components of a plant disease control agent and examples thereof include compounds (for example, see Patent Document 1) represented by the following Formula (1).

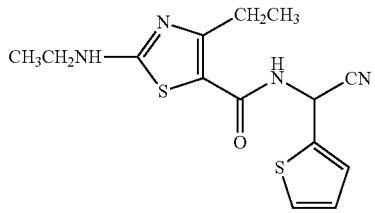

CITATION LIST

Patent Document

[Patent Document 1] Specification of U.S. Pat. No. 5,514,643

SUMMARY OF THE INVENTION

Problems to Be Solved By Invention

An object of the present invention is to provide a composition for controlling plant diseases having excellent plant disease controlling activity and a method for controlling plant diseases.

Means to Solve Problems

The present inventors have studied to find out a composition for controlling plant diseases having excellent plant disease controlling activity. As a result, the present inventors have found that a composition for controlling plant diseases containing a compound represented by the following Formula (1), a compound represented by the following Formula (2), and a compound represented by the following Formula (3) exhibits excellent activity of controlling plant disease.

That is, the present invention is as follows.

[1] A composition for controlling plant diseases comprising:
a compound represented by the following Formula (1):

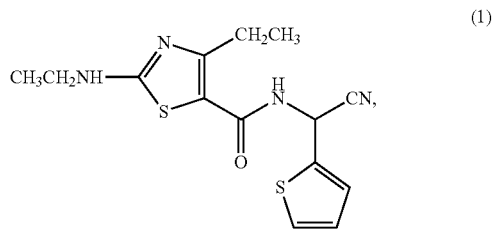

a compound represented by the following Formula (2):

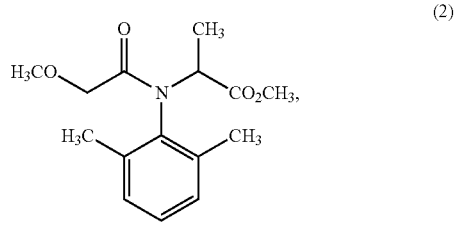 [SMILES: COCC(=O)N(c1c(C)cccc1C)C(C)C(=O)OC]

and a compound represented by the following Formula (3):

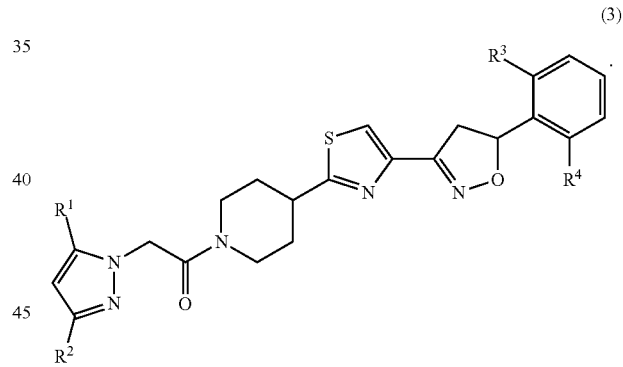

wherein a combination of $R^1$, $R^2$, $R^3$, and $R^4$ is a combination in which $R^1$ represents a methyl group, $R^2$ represents a trifluoromethyl group, and both of $R^3$ and $R^4$ represent a fluorine atom, or a combination in which both of $R^1$ and $R^2$ represent a difluoromethyl group, $R^3$ represents a chlorine atom, and $R^4$ represents a methanesulfonyloxy group.

[2] The composition for controlling plant diseases according to [1], in which the weight ratio of the compound represented by the above-described Formula (1) to the compound represented by the above-described Formula (2) is in a range of 1:0.02 to 1:50.

[3] The composition for controlling plant diseases according to [1] or [2], in which the weight ratio of the compound represented by the above-described Formula (1) to the compound represented by the above-described Formula (3) is in a range of 1:0.02 to 1:50.

[4] The composition for controlling plant diseases according to any one of [1] to [3], in which the compound represented by the above-described Formula (3) is a compound in which $R^1$ represents a methyl group, $R^2$ represents a trifluoromethyl group, and both of $R^3$ and $R^4$ represent a fluorine atom, in the above-described Formula (3).

[5] A method for controlling plant diseases, comprising a step of applying an effective amount of a compound represented by the following Formula (1):

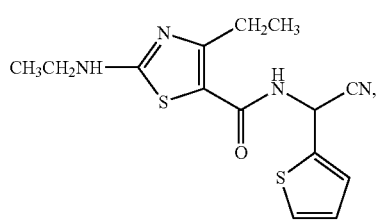

a compound represented by the following Formula (2):

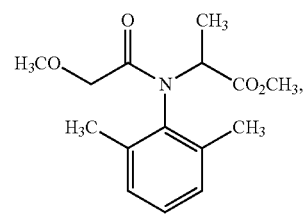

and a compound represented by the following Formula (3):

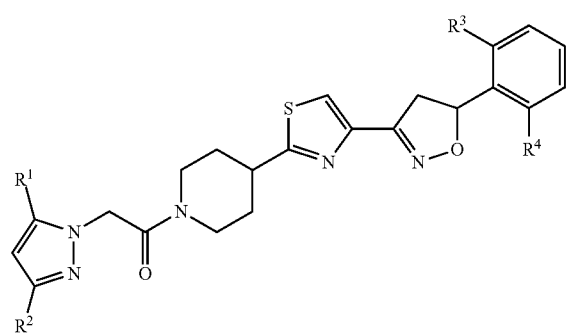

wherein a combination of $R^1$, $R^2$, $R^3$, and $R^4$ is a combination in which $R^1$ represents a methyl group, $R^2$ represents a trifluoromethyl group, and both of $R^3$ and $R^4$ represent a fluorine atom, or a combination in which both of $R^1$ and $R^2$ represent a difluoromethyl group, $R^3$ represents a chlorine atom, and $R^4$ represents a methanesulfonyloxy group, to a plant or soil for cultivating a plant.

[6] A seed treatment agent, comprising a compound represented by the following Formula (1):

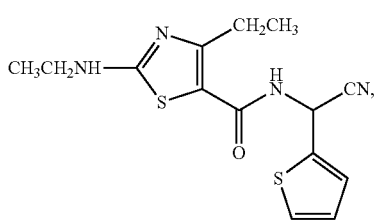

a compound represented by the following Formula (2):

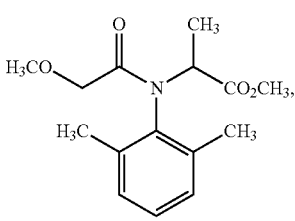

and a compound represented by the following Formula (3):

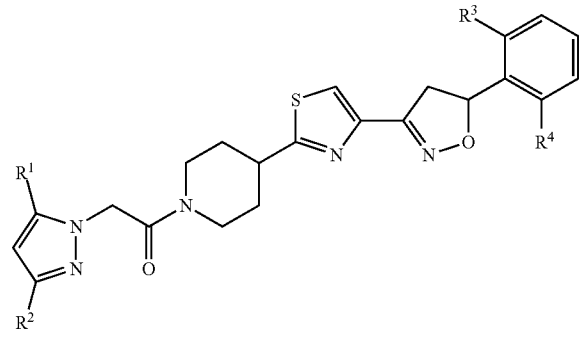

wherein a combination of $R^1$, $R^2$, $R^3$, and $R^4$ is a combination in which $R^1$ represents a methyl group, $R^2$ represents a trifluoromethyl group, and both of $R^3$ and $R^4$ represent a fluorine atom, or a combination in which both of $R^1$ and $R^2$ represent a difluoromethyl group, $R^3$ represents a chlorine atom, and $R^4$ represents a methanesulfonyloxy group.

[7] Plant seeds treated with a compound represented by the following Formula (1):

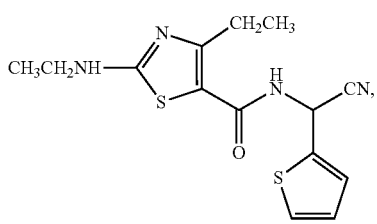

a compound represented by the following Formula (2):

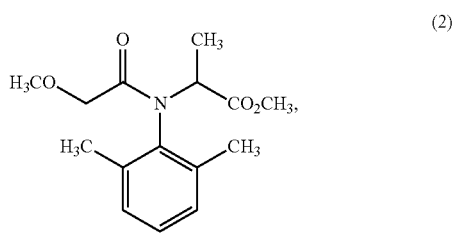 [SMILES: COCC(=O)N(c1c(C)cccc1C)C(C)C(=O)OC]

(2)

and a compound represented by the following Formula (3):

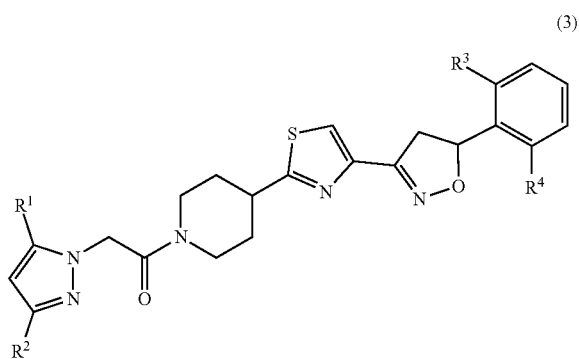

(3)

wherein a combination of $R^1$, $R^2$, $R^3$, and $R^4$ is a combination in which $R^1$ represents a methyl group, $R^2$ represents a trifluoromethyl group, and both of $R^3$ and $R^4$ represent a fluorine atom or a combination in which both of $R^1$ and $R^2$ represent a difluoromethyl group, $R^3$ represents a chlorine atom, and $R^4$ represents a methanesulfonyloxy group,
to a plant or soil for cultivating a plant.

Effect of Invention

According to the present invention, it is possible to control plant diseases.

Mode for Carrying Out the Invention

A composition for controlling plant diseases of the present invention (hereinafter, referred to as the present composition) comprises a compound represented by the above-described Formula (1) (hereinafter, referred to as the present compound (1)), a compound represented by the above-described Formula (2) (hereinafter, referred to as the present compound (2)), and a compound represented by the above-described compound (3) (hereinafter, referred to as the present compound (3)).

The present compound (1) is disclosed in Specification of US Patent No. 5514643 and known as a general name of ethaboxam. The present compound (1) can be obtained from a commercial formulation or can be produced by using a known method.

The present compound (2) is disclosed in Specification of U.S. Pat. No. 4,317,916 and a racemic body is known as a general name of metalaxyl. Further, an R body thereof is known as a general name of metalaxyl-M and the present compound (2) also includes metalaxyl-M. The present compound (2) can be obtained from a commercial formulation or can be produced by using a known method.

The present compound (3) is a compound (hereinafter, referred to as the present compound (3a)) in which $R^1$ represents a methyl group, $R^2$ represents a trifluoromethyl group, and both of $R^3$ and $R^4$ represent a fluorine atom, in the above-described Formula (3), or a compound (hereinafter, referred to as the present compound (3b)) in which both of $R^x$ and $R^2$ represent a difluoromethyl group, $R^3$ represents a chlorine atom, and $R^4$ represents methanesulfonyloxy group, in the above-described Formula (3). The present compound (3a) is disclosed in WO2008/013622A and known as a general name of oxathiapiprolin. The present compound (3a) can be obtained from a commercial formulation or can be produced by using a known method.

The present compound (3b) is disclosed in WO2012/025557A. The present compound (3b) can be obtained from a commercial formulation or can be produced by using a known method.

In the present composition, the ratio of the present compound (1), the present compound (2), and the present compound (3) is not particularly limited, but the ratio of the present compound (2) is usually in a range of 2 to 5000 parts by weight and preferably in a range of 10 to 1000 parts by weight with respect to 100 parts by weight of the present compound (1) and the content amount of the present compound (3) is usually in a range of 2 to 5000 parts by weight and preferably in a range of 10 to 1000 parts by weight with respect to 100 parts by weight of the present compound (1).

As the present composition, a composition obtained by simply mixing the present compound (1), the present compound (2), and the present compound (3) with each other may be used, but a composition obtained by mixing the present compound (1), the present compound (2), the present compound (3), and inert carriers such as a solid carrier and a liquid carrier with each other may be used; adding a surfactant or other adjuvants for a formulation to the mixture as necessary; and performing formulation into an oil, an emulsion, a flowable agent, wettable powder, granulated wettable powder, a powder agent, and granules is usually used.

The total amount of the present compound (1), the present compound (2), and the present compound (3) in the present composition is usually in a range of 0.01% to 99% by weight, preferably in a range of 0.1% to 90% by weight, and more preferably in a range of 0.5% to 70% by weight.

Examples of the solid carriers used for the formulation include fine powder or a granular material composed of minerals such as kaolin clay, attapulgite clay, bentonite, montmorillonite, acid clay, pyrophylite, talc, diatomaceous earth, and calcite; natural organic substances such as corn cob powder and walnut shell powder; a synthetic organic substance such as urea; salts such as calcium carbonate and ammonium sulfate; synthetic inorganic substances such as synthetic hydrated silicon oxide. Examples of the liquid carriers include aromatic hydrocarbons such as xylene, toluene, and methyl naphthalene; alcohols such as 2-propanol, ethylene glycol, propylene glycol, and ethylene glycol monoethyl ether; ketones such as acetone, cyclohexanone, and isophorone; vegetable oils such as soybean oil and cottonseed oil; petroleum-based aliphatic hydrocarbons; esters; dimethyl sulfoxide; acetonitrile; and water.

Examples of the surfactant include anionic surfactants such as alkylsulfuric acid ester salts, alkyl aryl sulfonate, dialkyl sulfosuccinate, polyoxyethylene alkyl aryl ether phosphate salts, lignin sulfonate, and a naphthalene sulfonate formaldehyde polycondensate; non-ionic surfactants such as polyoxyethylene alkyl aryl ether, a polyoxyethylene alkyl polyoxypropylene block copolymer, and sorbitan fatty acid ester; and cationic surfactants such as alkyl trimethyl ammonium salts.

Examples of other adjuvants for a formulation include water-soluble polymers such as polyvinyl alcohol and polyvinyl pyrrolidone; polysaccharides such as gum arabic, alginic acid and salts thereof, CMC (carboxymethyl cellulose), and xanthan gum; inorganic substances such as aluminum magnesium silicate and alumina sol; and stabilizing agents such as preservatives, coloring agents and PAP (isopropyl acid phosphate), and BHT.

The present composition can be prepared by formulating the present compound (1), the present compound (2), and the present compound (3) according to the above-described method to obtain formulations, or mixing these formulations into water to obtain mixed solution, and then mixing these mixing solutions.

The present composition may contain one or more other fungicides and/or insecticides and/or plant growth regulators. Examples of combinations of compounds include the following combinations. In this case, α1 in the following combinations represents N-(1,1,3-trimethylindane-4-yl)-1-methyl-3-difluoromethylpyrazole-4-carboxylic acid amide and includes a racemic body or an enantiomer, and a mixture having an arbitrary percentage of an enantiomer of an R body and an arbitrary percentage of an enantiomer of an S body.

Combination of fludioxonil, mandestrobin, clothianidin, α1, ipconazole, metalaxyl, ethaboxam, oxathiapiprolin, and thiabendazole Combination of fludioxonil, mandestrobin, clothianidin, α1, ipconazole, metalaxyl-M, ethaboxam, oxathiapiprolin, and thiabendazole Combination of fludioxonil, mandestrobin, clothianidin, α1, metconazole, metalaxyl, ethaboxam, oxathiapiprolin, and thiabendazole Combination of fludioxonil, mandestrobin, clothianidin, α1, metconazole, metalaxyl-M, ethaboxam, oxathiapiprolin, and thiabendazole Combination of fludioxonil, mandestrobin, clothianidin, tolclofos-methyl, ipconazole, metalaxyl, ethaboxam, oxathiapiprolin, and thiabendazole Combination of fludioxonil, mandestrobin, clothianidin, tolclofos-methyl, ipconazole, metalaxyl-M, ethaboxam, oxathiapiprolin, and thiabendazole Combination of fludioxonil, mandestrobin, clothianidin, tolclofos-methyl, metconazole, metalaxyl, ethaboxam, oxathiapiprolin, and thiabendazole Combination of fludioxonil, mandestrobin, clothianidin, tolclofos-methyl, metconazole, metalaxyl-M, ethaboxam, oxathiapiprolin, and thiabendazole Combination fludioxonil, mandestrobin, thiamethoxam, α1, ipconazole, metalaxyl, ethaboxam, oxathiapiprolin, and thiabendazole Combination of fludioxonil, mandestrobin, thiamethoxam, α1, ipconazole, metalaxyl-M, ethaboxam, oxathiapiprolin, and thiabendazole Combination of fludioxonil, mandestrobin, thiamethoxam, α1, metconazole, metalaxyl, ethaboxam, oxathiapiprolin, and thiabendazole Combination of fludioxonil, mandestrobin, thiamethoxam, α1, metconazole, metalaxyl-M, ethaboxam, oxathiapiprolin, and thiabendazole Combination of fludioxonil, mandestrobin, thiamethoxam, tolclofos-methyl, ipconazole, metalaxyl, ethaboxam, oxathiapiprolin, and thiabendazole Combination of fludioxonil, mandestrobin, thiamethoxam, tolclofos-methyl, ipconazole, metalaxyl-M, ethaboxam, oxathiapiprolin, and thiabendazole Combination of fludioxonil, mandestrobin, thiamethoxam, tolclofos-methyl, metconazole, metalaxyl, ethaboxam, oxathiapiprolin, and thiabendazole Combination of fludioxonil, mandestrobin, thiamethoxam, tolclofos-methyl, metconazole, metalaxyl-M, ethaboxam, oxathiapiprolin, and thiabendazole The present composition is used to protect plants from disease.

Examples of the plant diseases which can be controlled by the present composition, exhibiting controlling activity, include the following.

Rice diseases: blast (*Magnaporthe grisea*), brown spot (*Cochliobolus mivabeanus*), sheath blight (*Rhizoctonia solani*), and bakanae (*Gibberella fujikuroi*);

Wheat diseases: powdery mildew (*Erysiphe graminis*), fusarium head blight (*Fusarium graminearum, F. avenacerum, F. culmorum, Microdochium nivale*), rust (*Puccinia striiformis, P. graminis, P. recondita*), pink snow rot (*Micronectriella nivale*), Typhula snow blight (*Typhula* spp.), loose smut (*Ustilago tritici*), smut (*Tilletia caries*), Eyespot (*Pseudocercosporella herpotrichoides*), leaf blight (*Mycosphaerella graminicola*), septoria leaf spot (*Stagonospora nodorum*), and tan spot (*Pyrenophora tritici-repentis*);

Barley diseases: powdery mildew (*Erysiphe graminis*), Fusarium head blight (*Fusarium graminearum, F. avenacerum, F. culmorum, Microdochium nivale*), rust (*Puccinia striiformis, P. graminis, P. hordei*), loose smut (*Ustilago nuda*), leaf blotch (*Rhynchosporium secalis*), net blotch (*Pyrenophora teres*), leaf spot (*Cochliobolus sativus*), leaf stripe (*Pyrenophora graminea*), and Rhizoctonia damping-off (*Rhizoctonia solani*);

Corn diseases: smut (*Ustilago maydis*), brown leaf spot (*Cochliobolus heterostrophus*), copper spot (*Gloeocercospora sorghi*), southern rust (*Puccinia polysora*), gray leaf spot (*Cercospora zeae-maydis*), Rhizoctonia damping-off (*Rhizoctonia solani*), and downy mildew of corn (*Peronosclerospora philippinensis*);

Citrus diseases: melanose (*Diaporthe citri*), scab (*Elsinoe fawcetti*), green mold (*Penicillium digitatum*) and blue mold (*Penicillium italicum*), and brown rot (*Phytophthora parasitica, Phytophthora citrophthora*);

Apple diseases: blossom blight (*Monilinia mali*), canker (*Valsa ceratosperma*), powdery mildew (*Podosphaera leucotricha*), Alternaria leaf spot (*Alternaria alternate* apple pathotype), scab (*Venturia inaequalis*), bitter rot (*Colletotrichum acutatum*), crawn rot (*Phytophtora cactorum*), blotch (*Diplocarpon mali*), ring rot (*Botryosphaeria berengeriana*), violet root rot (*Helicobasidium mompa*);

Pear diseases: scab (*Venturia nashicola, V. pirina*), black spot (*Alternaria alternata* Japanese pear pathotype), rust (*Gymnosporangium haraeanum*), phytophthora fruit rot (*Phytophtora cactorum*);

Peach diseases: brown rot (*Monilinia fructicola*), scab (*Cladosporium carpophilum*) and Phomopsis rot (*Phomopsis* spp.);

Grapes diseases: anthracnose (*Elsinoe ampelina*), ripe rot (*Glomerella cingulata*), powdery mildew (*Uncinula necator*), rust (*Phakopsora ampelopsidis*), black rot (*Guignardia bidwellii*), and downy mildew (*Plasmopara viticola*);

Japanese persimmon diseases: anthracnose (*Gloeosporium kaki*) and leaf spot (*Cercospora kaki, Mycosphaerella nawae*);

Gourd family diseases: anthracnose (*Colletotrichum lagenarium*), powdery mildew (*Sphaerotheca fuliginea*), gummy stem blight (*Mycosphaerella melonis*), Fusarium wilt (*Fusarium oxysporum*), downy mildew (*Pseudoperonospora cubensis*), Phytophthora rot (*Phytophthora* spp.), and damping-off (*Pythium* spp.);

Tomato diseases: early blight (*Alternaria solani*), leaf mold (*Cladosporium fulvum*) and late blight (*Phytophthora infestans*);

Egg plant diseases: brown spot (*Phomopsis vexans*) and powdery mildew (*Erysiphe cichoracearum*);

Cruciferous vegetable diseases: *Alternaria* leaf spot (*Alternaria japonica*), white spot (*Cercosporella brassicae*), clubroot (*Plasmodiophora brassicae*), and downy mildew (*Peronospora parasitica*);

Welsh onion diseases: rust (*Puccinia allii*) and downy mildew (*Peronospora destructor*);

Soybean diseases: purple seed stain (*Cercospora kikuchii*), sphaceloma scad (*Elsinoe glycines*), pod and stem blight (*Diaporthe phaseolorum* var. *sojae*), septoria brown spot (*Septoria glycines*), frogeye leaf spot (*Cercospora sojina*), rust (*Phakopsora pachyrhizi*), brown stem rot (*Phytophthora sojae*), and *Rhizoctonia* damping-off (*Rhizoctonia solani*);

Kidney bean disease: anthracnose (*Colletotrichum lindemthianum*);

Peanut diseases: leaf spot (*Cercospora personata*), brown leaf spot (*Cercospora arachidicola*), and southern blight (*Sclerotium rolfsii*);

Garden pea diseases: powdery mildew (*Erysiphe pisi*) and root rot (*Fusarium solani* f. sp. *pisi*);

Potato diseases: early blight (*Alternaria solani*), late blight (*Phytophthora infestans*), pink rot (*Phytophthora erythroseptica*), powdery scab (*Spongospora subterranean*, F. sp. *Subterranean*), and black scurf (*Rhizoctonia solani*);

Strawberry diseases: powdery mildew (*Sphaerotheca humuli*) and anthracnose (*Glomerella cingulata*);

Tea diseases: net blister blight (*Exobasidium reticulatum*), white scab (*Elsinoe leucospila*), gray blight (*Pestalotiopsis* spp.) and anthracnose (*Colletotrichum theae-sinensis*);

Tobacco diseases: brown spot (*Alternaria longipes*), powdery mildew (*Erysiphe cichoracearum*), anthracnose (*Colletotrichum tabacum*), downy mildew (*Peronospora tabacina*) and black shank (*Phytophthora nicotianae*);

Rapeseed diseases: sclerotinia rot (*Sclerotinia sclerotiorum*) and *Rhizoctonia* damping-off (*Rhizoctonia solani*);

Cotton diseases: *Rhizoctonia* damping-off (*Rhizoctonia solani*);

Sugar beet diseases: *Cercospora* leaf spot (*Cercospora beticola*), leaf blight (*Rhizoctonia solani*), root rot (*Rhizoctonia solani*), and *Aphanomyces* root rot (*Aphanomyces cochlioides*);

Rose diseases: black spot (*Diplocarpon rosae*), powdery mildew (*Sphaerotheca pannosa*), and downy mildew (*Peronospora sparsa*);

Diseases of chrysanthemum and asteraceous vegetables: downy mildew (*Bremia lactucae*), leaf blight (*Septoria chrysanthemi-indici*), and white rust (*Puccinia horiana*);

Diseases of various groups: diseases caused by *Pythium* spp. (*Pythium debarianum, Pythium graminicola, Pythium irregulare, Pythium ultimum*), gray mold (*Botrytis cinerea*), Sclerotinia rot (*Sclerotinia sclerotiorum*), and southern blight (*Sclerotium rolfsii*);

Radish disease: *Alternaria* leaf spot (*Alternaria brassicicola*);

Turf grass diseases: dollar spot (*Sclerotinia homeocarpa*), and brown patch and large patch (*Rhizoctonia solani*);

Banana disease: sigatoka (*Mycosphaerella fijiensis, Mycosphaerella musicola*);

Sunflower disease: downy mildew (*Plasmopara halstedii*);

Seed diseases or diseases in the early stages of the growth of various plants caused by bacteria of *Aspergillus* spp., *Penicillium* spp., *Fusarium* spp., *Gibberella* spp., *Tricoderma* spp., *Thielaviopsis* spp., *Rhizopus* spp., *Mucor* spp., *Corticium* spp., *Phoma* spp., *Rhizoctonia* spp. and *Diplodia* spp.; and Viral diseases of various plants mediated by *Polymixa* genus or *Olpidium* genus.

Specific examples of the diseases expected to have high activity during treatment of seeds, bulbs or the like include damping-off and root rot caused by *Pythium* spp. (*Pythium debarianum, Pythium graminicola, Pythium irregulare, Pythium ultimum*) of wheat, barley, corn, rice, sorghum, soybeans, cotton, rapeseed, cucumbers, sunflowers, and grass and sugar beet; *Aphanomyces* root rot (*Aphanomyces cochlioides*) of sugar beet; brown stem rot (*Phytophthora sojae*) of soybean; late blight (*Phytophthora nicotianae*) of tobacco; downy mildew (*Plasmopara halstedii*) of sunflower; late blight (*Phytophthora infestans*) of potato; and downy mildew (*Peronosclerospora philippinensis*) of corn.

The method of controlling plant diseases of the present invention (hereinafter, referred to as the control method of the present invention) includes a step of applying an effective amount of the present compound (1), the present compound (2), and the present compound (3) to a plant or soil for cultivating a plant. Examples of the plants serving as objects of the application include foliage of plants, seeds of plants, bulbs of plants, and the like. Here, the bulbs mean corms, rhizomes, tubers, root tubers, and rhizophores.

The present compound (1), the present compound (2), and the present compound (3) may be separately applied in the same period, but are usually applied as an effective amount of the present composition from the viewpoint of simplicity during the application. Examples of the application forms include a treatment of foliage, a treatment of soil, a treatment of roots, and a treatment of seeds. In the treatment of seeds, the present composition can be used as a seed treatment agent.

As the treatment of foliage, a method of applying the composition to the surface of a plant being cultivated by means of foliar treatment and spraying to a trunk may be exemplified. As the treatment of soil, spraying onto the soil, admixing with the soil, and perfusion of a liquid chemical into the soil may be exemplified. As the treatment of roots, a method of immersing the whole plant or a root part of a plant in a liquid chemical and a method of attaching a formulation which is formulated using a solid carrier to a root part of a plant may be exemplified.

As the treatment of seeds, a treatment of seeds or bulbs of plants to be protected from plant diseases with the present composition may be exemplified. Specific examples thereof include a spraying treatment in which a suspension of the present composition is atomized and sprayed on the seed surface or the bulb surface; a smearing treatment in which a solution prepared by dissolving in a solvent, wettable powder, an emulsion, or a flowable agent of the present composition to which water is added as necessary is applied to seeds or bulbs; an immersing treatment of immersing seeds in an aqueous dispersion of the present composition for a certain period of time; a film coating treatment; and a pellet coating treatment.

The application amount of the present compound (1), the present compound (2), and the present compound (3) according to the control method of the present invention may be changed depending on the type of plant to be applied, the type and the frequency of occurrence of the plant diseases to be controlled, the formulation form, the application period, climatic conditions and the like, but, in a case where the present compound (1), the present compound (2), and the present compound (3) are applied to foliage of a plant or soil for cultivating a plant, the total application amount of the present compound (1), the present compound (2), and the present compound (3) (hereinafter, referred to as the amount of the active components) is usually 1 g to 5000 g and preferably 2 g to 500 g per 10000 m$^2$.

The emulsion, wettable powder, flowable agent or the like is usually mixed with water to obtain a liquid chemical, and then the liquid chemical is sprayed for treatment. The concentration of the amount of the active components in the liquid chemical is usually in the range of 0.0001% by weight to 3% by weight and preferably in a range of 0.0005% by weight to 1% by weight. The powder agent, the granule agent, or the like is usually used for treatment as it is.

In the treatment of seeds, the amount of the active components is usually in the range of 0.001 g to 10 g and preferably in a range of 0.01 g to 3 g per 1 kg of seeds. The treatment for seeds is applied to seeds which have not been sowed yet. The seeds which have not been sowed indicate seeds at an optional time until sowed.

As described above, seeds obtained by being treated with the present compound (1), the present compound (2), and the present compound (3) can be obtained by applying the treatment for seeds. The seeds hold the effective amount of the present compound (1), the present compound (2), and the present compound (3). Accordingly, the seeds or plants grown from the seeds are protected from diseases.

The control method of the present invention can be used in agricultural lands such as fields, paddy fields, lawns, and orchards or in non-agricultural lands. Examples of plants to which the control method of the present invention can be applied include the following plants.

Crops: corn, rice, wheat, barley, rye, oat, sorghum, cotton, soybean, peanut, buckwheat, sugar beet, rapeseed, sunflower, sugar cane, tobacco and the like;

Vegetables: solanaceous vegetables (eggplant, tomato, pimento, pepper, potato, and the like), cucurbitaceous vegetables (cucumber, pumpkin, zucchini, water melon, melon, squash, and the like), cruciferous vegetables (Japanese radish, turnip, horseradish, kohlrabi, Chinese cabbage, cabbage, leaf mustard, broccoli, cauliflower, or the like), asteraceous vegetables (burdock, crown daisy, artichoke, lettuce, and the like) liliaceous vegetables (green onion, onion, garlic, asparagus, and the like), ammiaceous vegetables (carrot, parsley, celery, parsnip, and the like), chenopodiaceous vegetables (spinach, Swiss chard, and the like), lamiaceous vegetables (*Perilla frutescens*, mint, basil, and the like), strawberry, sweet potato, Dioscorea japonica, colocasia, and the like;

Flowers;
Foliage plants;
Turf grasses;

Fruits: pomaceous fruits (apple, pear, Japanese pear, Chinese quince, quince, and the like), stone fleshy fruits (peach, plum, nectarine, Prunus mume, cherry fruit, apricot, prune, and the like), citrus fruits (Citrus unshiu, orange, lemon, rime, grapefruit, and the like), nuts (chestnuts, walnuts, hazelnuts, almond, pistachio, cashew nuts, macadamia nuts, and the like), berries (blueberry, cranberry, blackberry, raspberry, and the like), grape, kaki fruit, olive, Japanese plum, banana, coffee, date palm, coconuts, and the like; and Trees other than fruit trees; tea, mulberry, flowering plant, Jatropha curucas, roadside trees (ash, birch, dogwood, Eucalyptus, Ginkgo biloba, lilac, maple, Quercus, poplar, *Cercis chinensis, Liquidambar formosana*, plane tree, zelkova, Japanese arborvitae, fir wood, hemlock, juniper, Pinus, Picea, and *Taxus cuspidate*), and the like.

Among the above, in particular, the control method of the present invention can be used for cultivating corn, rice, wheat, barley, sorghum, cotton, soybean, sugar beet, rapeseed, turf grasses, and potato.

The above-described plants also include genetically modified plants.

EXAMPLES

Hereinafter, the present invention will be described in more detail using formulation examples, seed treatment examples, and test examples. However, the present invention is not limited to the following examples. In the following examples, parts represent parts by weight unless otherwise noted in particular.

Formulation Example 1

15 parts of ethaboxam, 5 parts of metalaxyl, and 15 parts of oxathiapiprolin were mixed into a mixture obtained by mixing 4 parts of sodium lauryl sulfate, 2 parts of calcium lignin sulfonate, 20 parts of synthetic hydrated silicon oxide fine powder, and 39 parts of diatomaceous earth with each other, and the mixture was fully stirred and mixed, thereby obtaining wettable powder.

Formulation Example 2

15 parts of ethaboxam, 5 parts of metalaxyl, and 15 parts of the present compound (3b) were mixed into a mixture obtained by mixing 4 parts of sodium lauryl sulfate, 2 parts of calcium lignin sulfonate, 20 parts of synthetic hydrated silicon oxide fine powder, and 39 parts of diatomaceous earth with each other, and the mixture was sufficiently stirred and mixed, thereby obtaining wettable powder.

Formulation Example 3

1.5 parts of ethaboxam, 0.5 parts of metalaxyl, 2 parts of oxathiapiprolin, 86 parts of kaolin clay, and 10 parts of talc were sufficiently ground and mixed with each other, thereby obtaining a powder agent.

Formulation Example 4

1.5 parts of ethaboxam, 0.5 parts of metalaxyl, 2 parts of the present compound (3b), 86 parts of kaolin clay, and 10 parts of talc were sufficiently ground and mixed with each other, thereby obtaining a powder agent.

Formulation Example 5

8 parts of ethaboxam, 2.5 parts of metalaxyl, 10 parts of oxathiapiprolin, 30 parts of a mixture containing polyoxyethylene alkyl ether sulfate ammonium salts and white carbon at a weight ratio of 1:1, and 49.5 parts of water were mixed with each other, and the mixture was finely ground according to a wet grinding method, thereby obtaining a flowable agent.

Formulation Example 6

8 parts of ethaboxam, 2.5 parts of metalaxyl, 10 parts of the present compound (3b), 30 parts of a mixture containing polyoxyethylene alkyl ether sulfate ammonium salts and white carbon at a weight ratio of 1:1, and 49.5 parts of water were mixed with each other, and the mixture was finely ground according to a wet grinding method, thereby obtaining a flowable agent.

Seed Treatment Example 1

Water was added to 4 g of the formulation obtained by the method described in Formulation Example 1 so that the total amount thereof was set to 40 ml, and the formulation was used for a smearing treatment applied to 10 kg of dried corn seeds using a rotary seed treatment machine (seed treater, Hege 11, manufactured by Wintersteiger Inc.), thereby obtaining treated seeds.

Seed Treatment Example 2

Water was added to 99.6 g of the formulation obtained by the method described in Formulation Example 2 so that the total amount thereof was set to 50 ml, and the formulation was used for a smearing treatment applied to 10 kg of dried soybean seeds using a rotary seed treatment machine (seed treater, Hege 11, manufactured by Wintersteiger Inc.), thereby obtaining treated seeds.

Seed Treatment Example 3

Water was added to 9.4 g of the formulation obtained by the method described in Formulation Example 5 so that the total amount thereof was set to 50 ml, and the formulation was used for a smearing treatment applied to 10 kg of dried wheat seeds using a rotary seed treatment machine (seed treater, Hege 11, manufactured by Wintersteiger Inc.), thereby obtaining treated seeds.

Test Example 1

An acetone solution containing the compounds was prepared such that the amounts of compounds to be treated for seeds were set to the dose rate listed in Table 1. 10 g of seeds of soybean (Hatayutaka) and 80 µl of the acetone solution were added to a plastic container, the container was covered with a lid and then shaken, and then the seeds taken out of the container were left overnight, thereby obtaining treated seeds. A plastic pot was filled with culture soil, and the treated seeds were sowed and then were covered with culture soil mixed with seeds of grass turf which was infected with Pythium damping-off pathogen (*Pythium irregulare*). After irrigation, the seeds were grown at 15° C. for 5 days and then grown at 25° C. for 10 days. This area was set to a treated area.

Further, soybeans were grown in the same manner as in the treated area except that a chemical agent was not applied to the seeds. This area was set to a non-treated area.

The incidence of disease of plants in the treated area and the non-treated area were calculated using the following "Equation 1". The control values were calculated using the following "Equation 2".

Incidence of disease=(Number of non-budded seeds and number of infected seedlings)×100/(Total number of sowed seeds)  "Equation 1"

Control value=100×(A−B)/A  "Equation 2"

A: Incidence of disease of plants of non-treated area
B: Incidence of disease of plants of treated area The results are listed in Table 1.

TABLE 1

| | Treatment dose rate (gai/100 kg seed) | | | Control value (%) |
|---|---|---|---|---|
| | Ethaboxam | Metalaxyl | Oxathiapiprolin | |
| 1 | 3.75 | | | 9 |
| 2 | | 1.0 | | 6 |
| 3 | | | 3.75 | 6 |
| 4 | | 1.0 | 3.75 | 9 |
| 5 | 3.75 | 1.0 | | 23 |
| 6 | 3.75 | 1.0 | 3.75 | 43 |

Test Example 2

An acetone solution containing the compounds was prepared such that the amounts of compounds to be treated for seeds were set to the dose rate listed in Table 2. 10 g of seeds of soybean (Hatayutaka) and 80 µl of the acetone solution were added to a plastic container, the container was covered with a lid and then shaken, and then the seeds taken out of the container were left overnight, thereby obtaining treated seeds. A plastic pot was filled with culture soil, and the treated seeds were sowed and then were covered with culture soil mixed with seeds of grass turf which was infected with Pythium damping-off pathogen (Pythium ultimum). After irrigation, the seeds were grown at 15° C. for 5 days and then grown at 25° C. for 10 days. This area was set to a treated area.

Further, soybeans were grown in the same manner as in the treated area except that a chemical agent was not applied to the seeds. This area was set to a non-treated area.

The incidence of disease of plants in the treated area and the non-treated area were calculated using the above-described "Equation 1". The control values were calculated using the above-described "Equation 2".

The results are listed in Table 2.

TABLE 2

| | Treatment dose rate (gai/100 kg seed) | | | Control value (%) |
|---|---|---|---|---|
| | Ethaboxam | Metalaxyl | Oxathiapiprolin | |
| 1 | 3.75 | | | 14 |
| 2 | | 1.0 | | 0 |
| 3 | | | 3.75 | 14 |
| 4 | 3.75 | | 3.75 | 29 |
| 5 | 3.75 | 1.0 | 3.75 | 39 |

INDUSTRIAL APPLICABILITY

Plant diseases can be controlled by the present invention.

The invention claimed is:

1. A composition for controlling plant diseases comprising:
a compound represented by Formula (1):

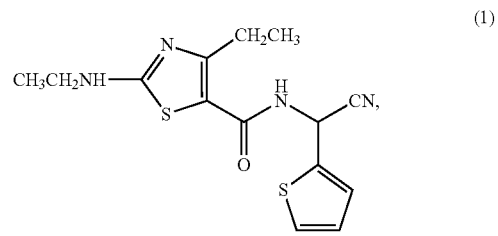

a compound represented by Formula (2):

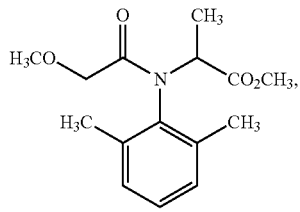

and a compound represented by Formula (3):

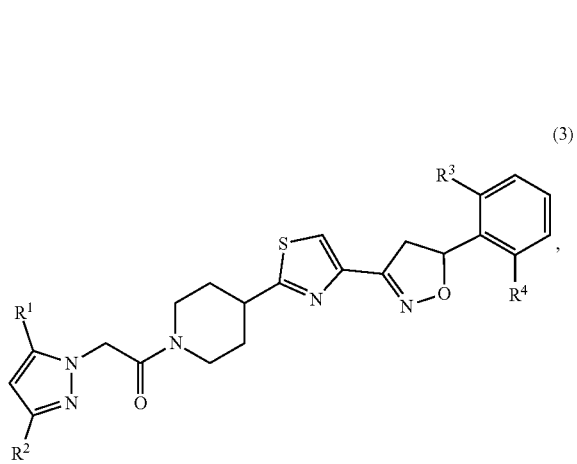

wherein a combination of $R^1$, $R^2$, $R^3$, and $R^4$ is a combination in which both of $R^1$ and $R^2$ represent a difluoromethyl group, $R^3$ represents a chlorine atom, and $R^4$ represents a methanesulfonyloxy group.

2. The composition for controlling plant diseases according to claim 1, wherein a weight ratio of the compound represented by Formula (1) to the compound represented by Formula (2) is in a range of 1:0.1 to 1:10, and a weight ratio of the compound represented by Formula (1) to the compound represented by Formula (3) is in a range of 1:0.1 to 1:10.

3. A method for controlling plant diseases, comprising applying an effective amount of a compound represented by Formula (1):

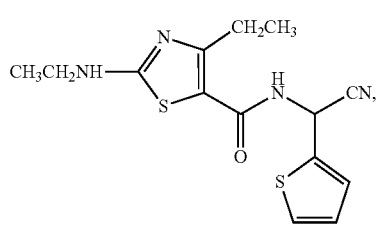

a compound represented by Formula (2):

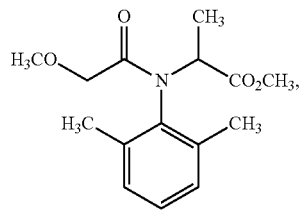

and a compound represented by Formula (3):

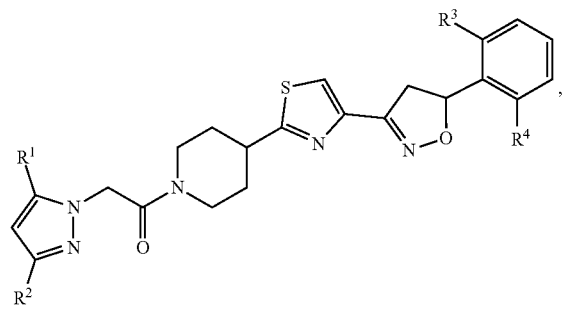

wherein a combination of $R^1$, $R^2$, $R^3$, and $R^4$ is a combination in which both of $R^1$ and $R^2$ represent a difluoromethyl group, $R^3$ represents a chlorine atom, and $R^4$ represents a methanesulfonyloxy group, to a plant or soil for cultivating a plant.

4. The method for controlling plant diseases according to claim 3, wherein a weight ratio of the compound represented by Formula (1) to the compound represented by Formula (2) is in a range of 1:0.1 to 1:10, and a weight ratio of the compound represented by Formula (1) to the compound represented by Formula (3) is in a range of 1:0.1 to 1:10.

5. A seed treatment agent, comprising a compound represented by Formula (1):

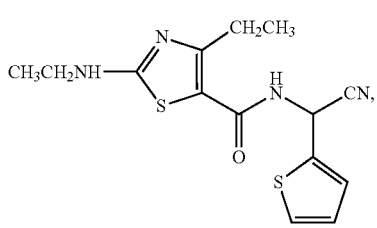

a compound represented by Formula (2):

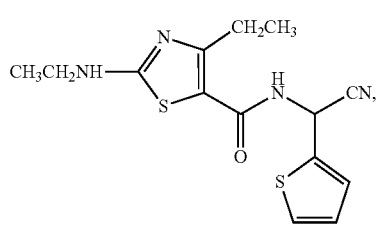

and a compound represented by Formula (3):

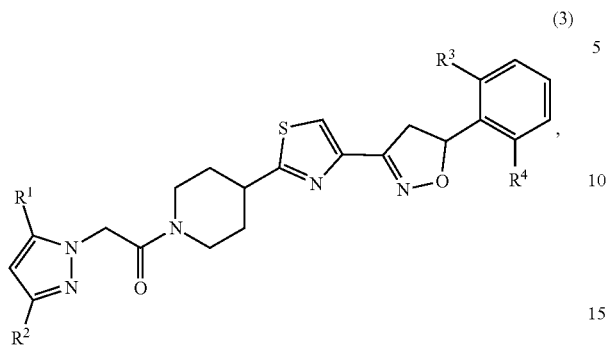

wherein a combination of $R^1$, $R^2$, $R^3$, and $R^4$ is a combination in which both of $R^1$ and $R^2$ represent a difluoromethyl group, $R^3$ represents a chlorine atom, and $R^4$ represents a methanesulfonyloxy group.

6. The seed treatment agent according to claim 5, wherein a weight ratio of the compound represented by Formula (1) to the compound represented by Formula (2) is in a range of 1:0.1 to 1:10, and a weight ratio of the compound represented by Formula (1) to the compound represented by Formula (3) is in a range of 1:0.1 to 1:10.

7. A plant seeds treated with a compound represented by Formula (1):

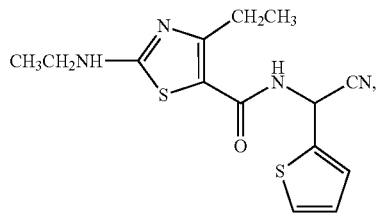

a compound represented by Formula (2):

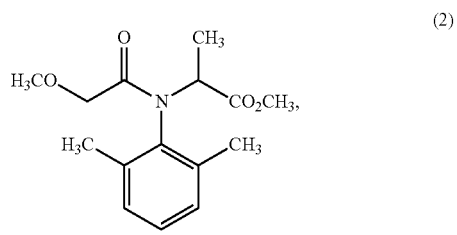 [SMILES: COCC(=O)N(c1c(C)cccc1C)C(C)C(=O)OC]

and a compound represented by Formula (3):

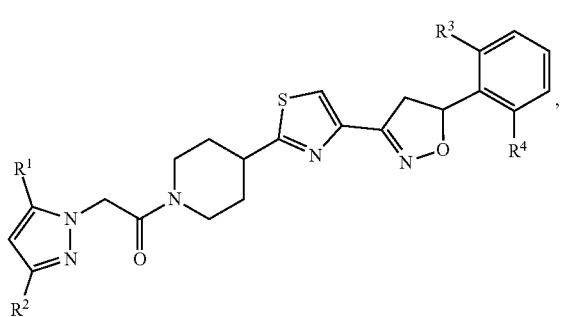

wherein a combination of $R^1$, $R^2$, $R^3$, and $R^4$ is a combination in which both of $R^1$ and $R^2$ represent a difluoromethyl group, $R^3$ represents a chlorine atom, and $R^4$ represents a methanesulfonyloxy group.

8. The plant seed according to claim 7, wherein a weight ratio of the compound represented by Formula (1) to the compound represented by Formula (2) is in a range of 1:0.1 to 1:10, and a weight ratio of the compound represented by Formula (1) to the compound represented by Formula (3) is in a range of 1:0.1 to 1:10.

* * * * *